Aug. 27, 1935.  E. J. DE NORMANVILLE  2,012,377
POWER TRANSMITTING MECHANISM
Filed Oct. 23, 1934   2 Sheets-Sheet 1

E. J. de Normanville
INVENTOR

By Glascock Downing Seebold
Attys.

Aug. 27, 1935.  E. J. DE NORMANVILLE  2,012,377
POWER TRANSMITTING MECHANISM
Filed Oct. 23, 1934  2 Sheets-Sheet 2

Patented Aug. 27, 1935

2,012,377

UNITED STATES PATENT OFFICE 2,012,377

POWER TRANSMITTING MECHANISM

Edgar Joseph de Normanville, Kingsbury, England, assignor of one-half to de Normanville Transmissions Limited, Coventry, England Application October 23, 1934, Serial No. 749,599
In Great Britain November 4, 1933

5 Claims. (Cl. 74—290)

This invention has for its object to provide an improved power transmitting mechanism of the epicyclic type adapted for use more particularly on motor vehicles, but applicable to a variety of analogous uses such as, for example, on machine tools.

The invention comprises the combination of a driving member, a driven member, a fixed member, an epicyclic mechanism for transmitting motion from the said driving member to the said driven member, a unidirectional clutch for connecting a rotatable part of the said mechanism to the said driven member, means for arresting another rotatable part of the said mechanism for varying the speed of the drive transmitted from the driving member to the driven member, and another unidirectional clutch for connecting the second mentioned part of the said mechanism to the said fixed member and for enabling motion to be transmitted from the said driven member to the said driving member when the said arresting means are in an inoperative position.

In the two accompanying sheets of explanatory drawings:—

Figure 1:
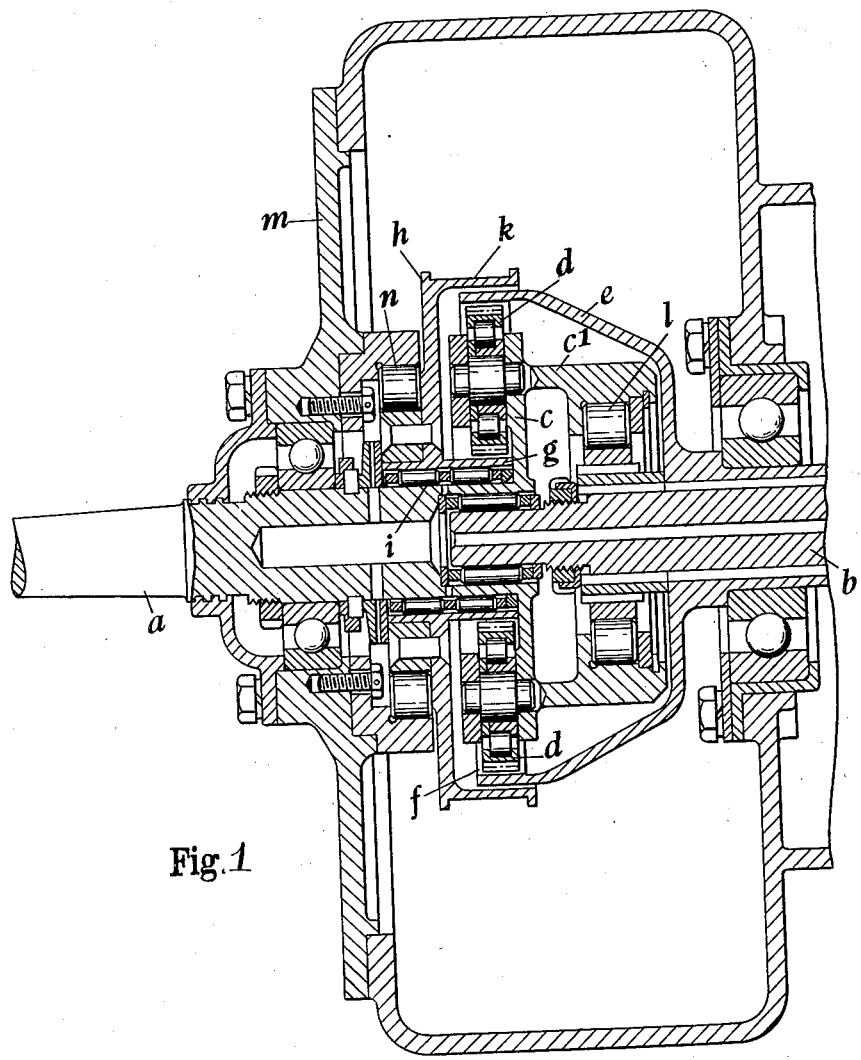
Figure 2:
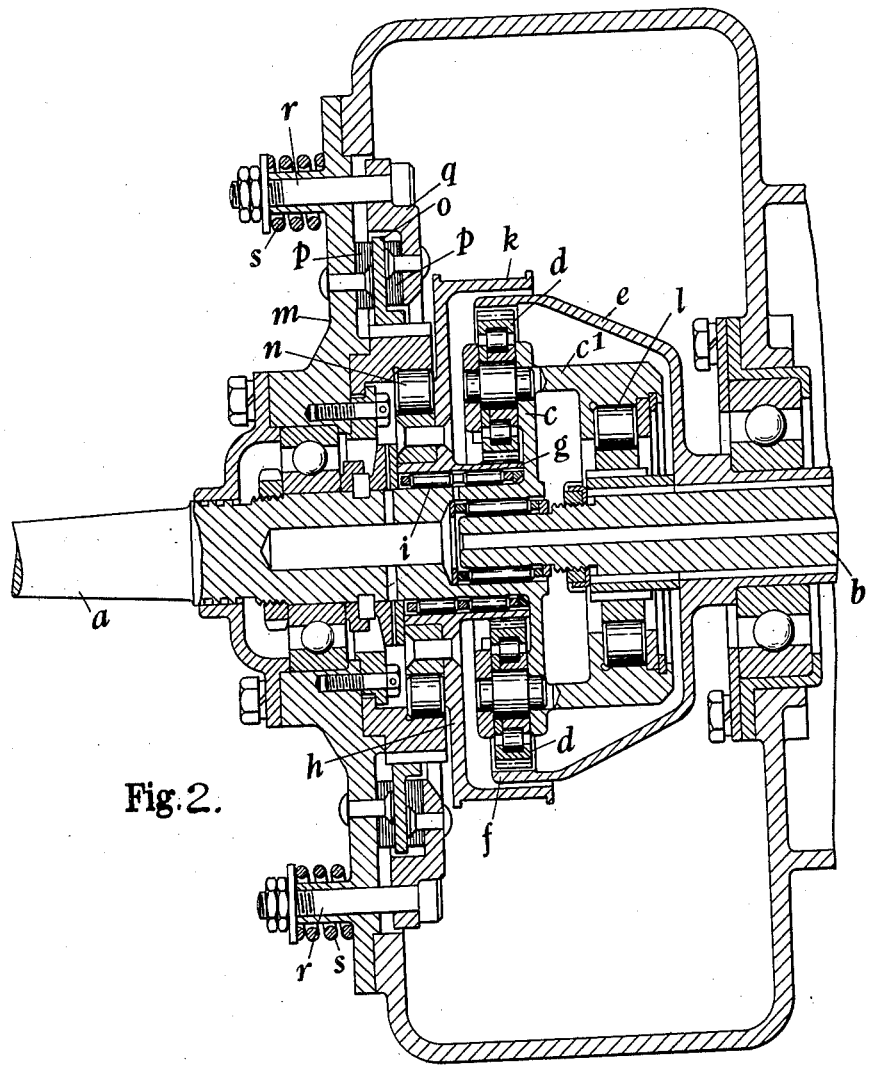

Figures 1 and 2 are sectional elevations respectively illustrating two different mechanisms constructed in accordance with this invention.

In the construction in accordance with this invention as shown in Figure 1 of a power transmitting mechanism which is adapted to supplement the ordinary variable speed transmission mechanism of a motor vehicle and which is arranged between the said ordinary mechanism and the usual engine driven clutch, or between the engine and the clutch, I employ a pair of coaxial shafts herein termed the driving shaft $a$ and the driven shaft $b$. The driving shaft is connected to the clutch or the engine and the driven shaft to the ordinary variable speed mechanism or the clutch. On the driving shaft $a$ is formed or secured a planet pinion carrier $c$ on which planet pinions $d$ are mounted, and on the driven shaft is formed or secured a member $e$ carrying an internally toothed annulus $f$ gearing with the planet pinions. The sun pinion $g$ is conveniently arranged at the centre of a member $h$ in the form of a case which encloses one end of the mechanism and is rotatably carried by a bearing $i$, a brake or other device (not shown) being arranged to act on the peripheral part $k$ of the member $h$ for holding or releasing it.

Also I provide in combination with the planet pinion carrier and the driven shaft, a unidirectional clutch $l$ (free wheel clutch) of any convenient form, this being mounted in the example shown between an extension $c^1$ of the planet carrier and the driven shaft.

The arrangement of the mechanism above described is such that when the member $h$ carrying the sun pinion $g$ is free and motion is being transmitted from the driving to the driven shaft, the epicyclic mechanism rotates as one piece, relative motion being prevented by the clutch $l$ between the planet carrier and the driven shaft. To drive the driven shaft at a higher speed than the driving shaft the member $h$ is held by the brake, and the clutch $l$ has then no effect.

Should motion be transmitted from the driven shaft to the driving shaft, while the sun pinion brake is operative, the engine will serve to resist the motion as in ordinary motor vehicle mechanisms, but should the sun pinion brake be released, the desired effective connection with the engine would no longer exist were it not for a second free wheel clutch $n$ arranged between the member $h$ and the stationary casing $m$. This clutch is such that it locks the sun pinion member to the casing when the shaft $b$ drives the engine, and so causes the desired connection with the engine to be maintained.

When it is desirable to limit the torque which can be imposed on the clutch $n$, I employ the arrangement shown in Figure 2. This arrangement is similar to the one shown in Figure 1, but in addition a slipping clutch or torque limiting device is placed between the clutch $n$ and the casing. In the example illustrated the outer ring of the clutch $n$ has combined in splined connection with it an annular ring $o$ the opposite faces of which co-operate with friction rings $p$ one of which is fixed to the casing, whilst the other is carried on a separate part $q$ attached to the casing by bolts $r$ on which springs $s$ are mounted for setting up the required interfacial pressure between the parts $o$, $p$, and $q$. This pressure is sufficient to hold the outer ring of the clutch under normal conditions, but in the event of an excessive torque being exerted on the clutch, the ring $o$ slips between the parts $p$ and so prevents injury to the mechanism.

By means of mechanisms as above described I am able to supplement the ordinary variable speed mechanism of a motor vehicle in a very simple and satisfactory manner.

The invention is not limited to the examples above described as subordinate details of construction may be varied to suit different requirements. The form of gearing above described is that which is preferred but it also may be modified if desired. Further the mechanisms may for some purposes be conveniently arranged between the ordinary transmission mechanism and the propeller shaft. Moreover, the invention, as already stated, is applicable to other uses in which variable speed transmission of power is required. Thus it may be applied to the operation of machine tools, or other machinery, or the propulsion of ships, or aircraft, or for connecting any prime mover to an apparatus to be driven between the said mechanism and both the driven shaft and a fixed casing, I may for some purposes provide a clutch between the epicyclic mechanism and the fixed casing only.

Having thus described my invention what I claim as new and desire to secure by Letters Patent is:—

1. In power transmitting mechanisms, the combination of an epicyclic mechanism, a unidirectional clutch for connecting a part of the mechanism to the driven shaft, another unidirectional clutch for connecting another part of the mechanism to a fixed member, and a torque limiting device associated with the second mentioned clutch.

2. A power transmitting mechanism comprising the combination of a two-speed epicyclic mechanism which contains sun and planet pinions, a planet pinion carrier, a driven annulus, and means for arresting the sun pinion, with a driving member, a driven member, a fixed member, a unidirectional clutch between the said planet pinion carrier and the said driven member, another unidirectional clutch between the said sun pinion and the said fixed member, and a torque limiting device between the second mentioned clutch and the said fixed member.

3. In power transmitting mechanisms, the combination of a driving member, a driven member, a fixed member, an epicyclic mechanism for transmitting motion from the said driving member to the said driven member, a unidirectional clutch for connecting a rotatable part of the said mechanism to the said driven member, means for arresting another rotatable part of the said mechanism for varying the speed of the drive transmitted from the driving member to the driven member, and another unidirectional clutch for connecting the second mentioned part of the said mechanism to the said fixed member and thereby enabling motion to be transmitted from the said driven member to the said driving member when the said arresting means are in an inoperative position.

4. In a mechanism as claimed in claim 3, the combination with the second mentioned clutch, of a torque limiting device.

5. A power transmitting mechanism comprising the combination of a two-speed epicyclic mechanism which contains sun and planet pinions, a planet pinion carrier, a driven annulus, and means for arresting the sun pinion, with a driving member, a driven member, a fixed member, a unidirectional clutch between the said planet pinion carrier and the said driven member, and another unidirectional clutch between the said sun pinion and the said fixed member.

EDGAR JOSEPH DE NORMANVILLE.